March 24, 1942. E. H. GREEN 2,277,225
INTERNAL COMBUSTION ENGINE
Filed July 21, 1941 4 Sheets-Sheet 1

Inventor
Edward H. Green

Inventor
Edward H. Green
By Fred Gerlach
Atty.

Patented Mar. 24, 1942

2,277,225

UNITED STATES PATENT OFFICE 2,277,225

INTERNAL COMBUSTION ENGINE

Edward H. Green, Chicago, Ill.

Application July 21, 1941, Serial No. 403,300

16 Claims. (Cl. 123—8)

The present invention relates generally to internal combustion engines. More particularly the invention relates to that type of internal combustion engine which is of the rotary variety and comprises a stator and a rotor.

One object of the invention is to provide an internal combustion engine of this type which is an improvement upon, and has certain advantages over, previously designed rotary engines and is characterized by the fact that it includes no conventional crank shaft and other parts which are essential to crank type engines, embodies but a small number of parts, and is extremely light in weight.

Another object of the invention is to provide an internal combustion engine of the type and character under consideration in which the stator comprises a pair of oppositely positioned heads and the rotor comprises an annular series of oscillatory hammer-shaped elements which surround, and are bodily rotatable about, the two heads, define with the heads and certain additional structure, combustion chambers and are adapted in connection with drive or rotation of the rotor to rock or oscillate relatively to the heads and in addition to coact with the heads in such manner as to vary the size of the combustion chambers.

Another object of the invention is to provide an internal combustion engine of the last mentioned character which includes cam means for oscillating or rocking the hammer-shaped elements relatively to the heads during drive or rotation of the rotor and includes means in addition to the cam means whereby the elements are caused to rock or oscillate in synchronism.

A further object of the invention is the provision of simple and novel cooling means for an engine of the aforementioned type.

A still further object of the invention is to provide a rotary internal combustion engine which is generally of new and improved construction and in which economy of maintenance and low oil consumption are combined with compactness and durability as well as increased mechanical efficiency.

Other objects of the invention and the various advantages and characteristics of the present internal combustion engine will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views.

The internal combustion engine which is shown in the drawings constitutes the preferred form or embodiment of the invention. It is essentially of the so-called rotary variety or type and comprises a stator and a rotor. The stator comprises as its main or primary parts a hollow supporting structure 12 at one end of the engine, a tubular supporting shaft 13, a cam holder 14, a cam 15 and a pair of hollow heads 16 and 17. The rotor includes as its principal parts a flywheel 18 and four hammer-shaped elements 19.

Figure 1:
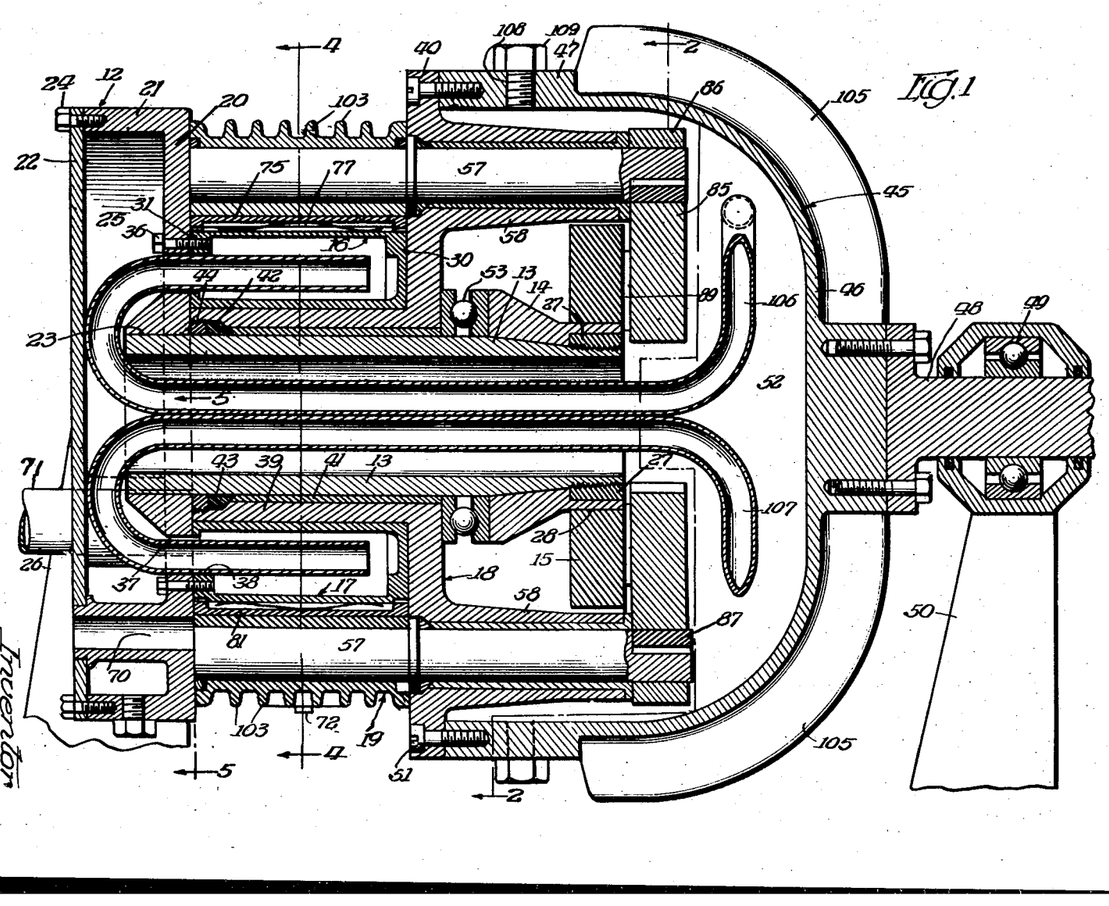
Figure 1 is a vertical longitudinal section of a rotary internal combustion engine embodying the invention.

The hollow supporting structure 12 is in the form of a drum and serves as a supporting medium for one end of the engine. It has additional functions as will be pointed out hereafter and comprises a circular or disc-like inner end wall 20, a cylindrical side wall 21 and a circular outer end wall 22. The central portion of the inner end wall 20 of the supporting structure 12 has a circular hole 23 therethrough. Preferably the portion of the end wall 20 that defines the hole 23 is thickened or enlarged for reenforcing purposes. The cylindrical side wall 21 projects outwardly from, and is formed integrally with, the marginal portion of the inner end wall 20. The outer end wall 22 is in the form of a cover for the hollow supporting structure 12 and is removably secured in place by way of bolts 24 which, as shown in Figure 1, extend through holes in the marginal or peripheral portion of the outer end wall 22 and fit within internally threaded sockets in the outer end of the cylindrical side wall 21. The outer and inner end walls 20 and 22 and the cylindrical side wall 21 together define a chamber 25. When the outer end wall 22 is removed from its operative or normal position access may be had to this chamber. The supporting structure 12 is preferably disposed in an upstanding position and has side legs 26 for supporting it with respect to the supporting surface or foundation on which the engine is placed. The tubular shaft 13 constitutes or serves as a supporting medium for one end of the rotor and extends horizontally, as shown in Figure 1. One end of the shaft fits snugly within the hole defining portion of the inner end wall 20 of the hollow supporting structure 12 and the other end is outwardly tapered and has the cam holder 14 applied thereto. The cam holder is tubular or ring-shaped and its inner periphery is tapered correspondingly to the taper of the outer end of the shaft 13. A collar 27 is connected by a screw thread connection to the outer extremity of the shaft. This collar fits within an annular groove in the cam holder 14 and serves to lock the cam holder on the shaft. The interior of the shaft is of uniform bore from one end thereof to the other and communicates with the chamber 25 in the hollow supporting structure 12. The cam 15 operates, as hereinafter described, to effect rocking of the hammer-shaped elements 19 relatively to the heads 16 and 17 of the stator and has in the central portion thereof a circular opening 28 into which fits the outer end of the cam holder 14. Preferably the cam is shrunk on the outer end of the cam holder so that it is in fixed or rigid relation with the latter.

Figures 4, 5, 6, 7:
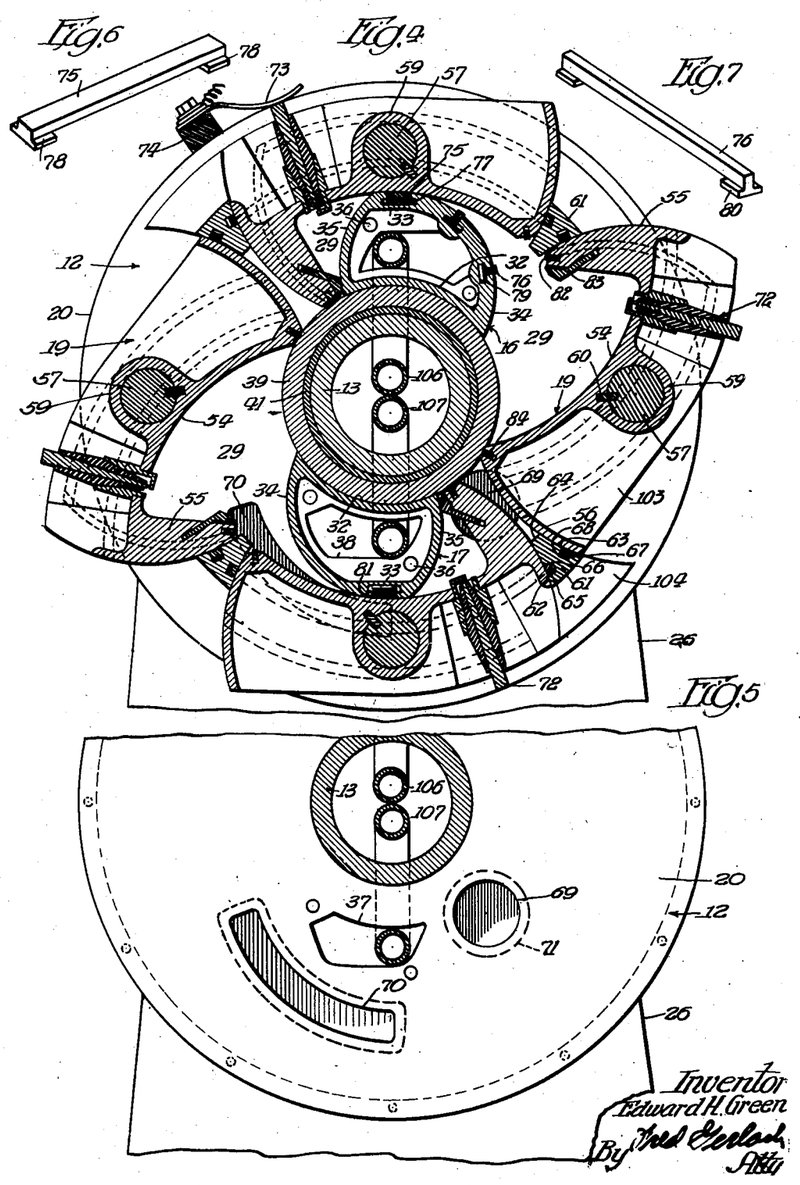
Figure 4 is a vertical transverse section taken on the line 4—4 of Figure 1 and illustrating the arrangement and design of the oppositely positioned heads of the stator and the construction and manner of mounting of the hammer-shaped elements of the rotor.
Figure 5 is a fragmentary vertical transverse section taken on the line 5—5 of Figure 1 and illustrating the arrangement and design of the fuel inlet port and the exhaust port in the hollow supporting structure which is at one end of the engine and forms part of the stator.
Figures 6 and 7 are perspective views of certain sealing members of one of the stationary heads.
Figure 8:
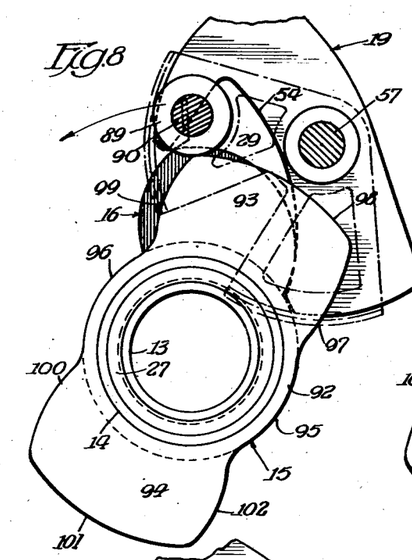
Figures 8 to 11, inclusive, are diagrammatic views showing the manner in which the stationary cam and rollers operate or function to effect rocking of the hammer-shaped elements with respect to the heads in connection with drive or rotation of the rotor.
Figure 9:
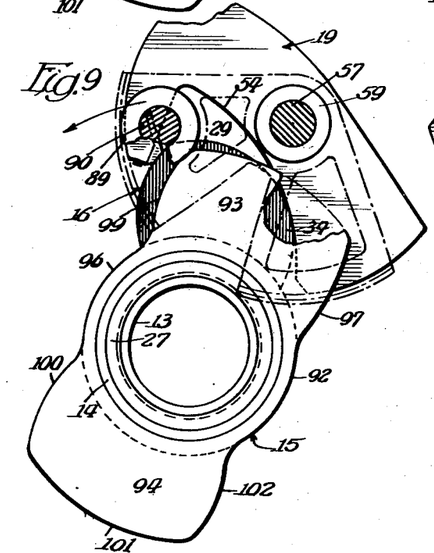
Figures 10, 11:
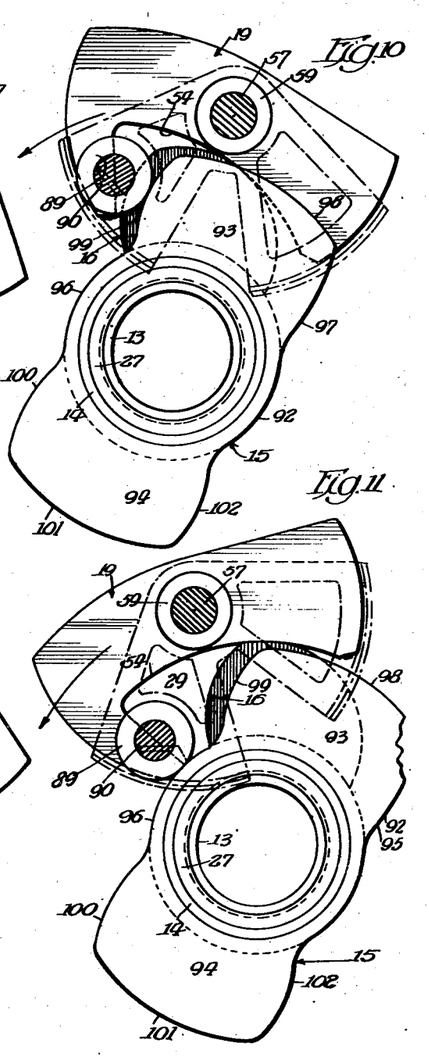

The heads 16 and 17 of the stator are hollow and form with the hammer-shaped elements 19 of the rotor together with certain other parts of the engine, variable size combustion chambers 29. They are disposed a comparatively small distance outwardly of the central portion of the supporting shaft 13 and are positioned one diametrically opposite the other. The head 16 is located above the central portion of the shaft 13 and the other head, that is, the head 17, is located beneath the shaft and in substantially vertical alignment with the head 16. The two heads are the same in size and shape and preferably are in the form of metallic castings. Each of the heads comprises a pair of spaced apart end walls 30 and 31, an inner wall 32, an outer wall 33, a front wall 34 and a rear wall 35. The end walls 31 of the two heads fit against the outer face of the inner end wall 20 of the hollow supporting structure 12 and are fixedly secured to the end wall by way of bolts 36. Slots 37 in the inner end wall 20 of the structure 12 and registering slots 38 in the end walls 31 of the two heads effect or establish communication between the head interiors and the chamber 25. The end walls 30 of the two heads are imperforate and are held in spaced relation with the end walls 31 by the inner and outer walls 32 and 33 and the front and rear walls 34 and 35. The inner walls 32 are arcuate in cross section and are so curved or shaped that the surfaces thereof nearer the tubular supporting shaft 13 are concentrically arranged with respect to the outer periphery of the shaft. The outer walls 33 of the heads 16 and 17 are positioned outwards of the inner walls 32 and have curved or arcuate outer surfaces which are concentrically arranged with respect to the shaft 13. The front walls 34 are arcuate in cross section, as shown in Figure 4, and have smooth outer surfaces which are uniformly curved and join the curved outer surfaces of the outer walls 33. The rear walls 35, like the front walls 34, are arcuate in cross section and have smooth outer surfaces. They are more abruptly curved than the front walls and are substantially half as large as the latter.

The flywheel 18 of the rotor carries the hammer-shaped elements 19, as described more in detail hereafter, and comprises an elongated hub 39 and an annular body 40. The hub 39 of the flywheel extends around the central portion of the tubular supporting shaft 13 and is journalled by way of a main bearing 41. The latter is rotatable about the central portion of the shaft 13 and fits snugly within the inner periphery of the flywheel hub 39. One end of the hub is joined to, and formed integral with, the inner portion of the annular body 40 of the flywheel and the other end abuts against the outer surface of the inner end wall 20 of the hollow supporting structure 12. The outer periphery of the flywheel hub engages slidably the inner walls 32 of the hollow heads 16 and 17 (see Figure 4). The end of the flywheel hub that is adjacent the inner end wall 20 of the hollow supporting structure is provided with an annular groove 42. This groove contains a packing 43 and is closed at its outer end by a collar type follower 44. The packing 43 prevents the products of combustion or other gases in the combustion chambers 29 from escaping between the flywheel hub 39 and the tubular supporting shaft 13. The inner portion of the annular body 40 of the flywheel fits against the end walls 30 of the two hollow heads 16 and 17 and serves as a closure for the inner ends of the combustion chambers 29. The inner portion of the inner end wall 20 of the hollow supporting structure 12 serves as a closure for the other or outer ends of the combustion chambers. The outer portion of the flywheel body 40 projects beyond the cylindrical side wall 21 of the supporting structure 12 and carries a cup-shaped shell 45. The latter is preferably in the form of a metallic casting. It comprises an end wall 46 and an annular side wall 47 and surrounds the cam 15 and the adjacent end of the tubular supporting shaft 13. A drive shaft 48 is coaxially positioned with respect to the shaft 13. One end of the drive shaft is bolted to the central portion of the end wall 46 of the shell 45 so that there is a driving connection between the shell and the shaft. The drive shaft is journalled in a ball bearing 49 and this, as shown in Figure 1, is carried by a pedestal 50. The latter is adapted to rest on the supporting surface or foundation for the engine and together with the side legs 26 constitutes a supporting medium for the engine. The rim of the annular side wall 47 of the shell abuts against the outer margin of the flywheel body 40 and is secured to the flywheel by way of bolts 51 which, as shown in Figure 1, extend through holes in the outer margin of the flywheel body and into internally threaded sockets in the rim of the side wall of the shell. The interior of the shell constitutes a chamber 52 which communicates with the chamber 25 in the hollow supporting structure 12 by way of the tubular supporting shaft 13. A thrust bearing 53 of the ball bearing type is disposed between the cam holder 14 and the inner margin of the flywheel body 40 and prevents thrust of the flywheel in the direction of the bearing 49 for the drive shaft 48.

The four hammer-shaped elements 19 are arranged in an annular series around the hub 39 of the flywheel 18. They are spaced equidistantly apart, as shown in Figure 4, and are preferably in the form of metallic castings. Each element comprises an arcuate central wall 54, an inwardly extending abutment 55 at the front or leading end of the central wall, and an outwardly extending rear wall 56. The central walls 54 of the elements are outwardly bowed and have smooth inner surfaces. The elements are pivotally connected to the body 40 of the flywheel 18 by way of horizontally extending rock shafts 57. The outer ends of these shafts are journalled in elongated tubular bearings 58 which are formed integrally with the outer portion of the flywheel body and are disposed in the chamber 52 in the shell 45. The inner ends of the rock shafts fit within tubular members 59 which are formed integrally with, and project outwardly from, the central portions of the central walls 54 of the elements. Keys 60 fit within aligned grooves in the members 59 and the inner ends of the shafts 57 and serve rigidly to connect the elements to the shafts. By reason of the fact that the outer ends of the shafts 57 are journalled in the elongated bearings 58 the elements are not only connected to the flywheel but also permitted to rock or oscillate relatively to the flywheel hub and the stationary heads 16 and 17. The abutments 55 at the front or leading ends of the central walls of the elements extend at substantially right angles with respect to the central walls and have convex or arcuate front surfaces. They are adapted when the elements are rocked in one direction to swing inwards toward the flywheel hub 39. The centers of the rock shafts 57 constitute the centers of the arcs of curvature of the front surfaces of the inwardly extending abutments 55. The inner surfaces of the abutments are substantially flat. The rear walls 56 of the elements are formed integrally with, and project outwardly from, the rear or trailing end of the central walls 54 and have convex or outwardly bulged outer surfaces. These surfaces are curved conformably to the front surfaces of the abutments 55. When the elements are caused to rock in the opposite direction the rear walls 56 are caused to swing inwards in the direction of the flywheel hub 39. When the elements are rocked counterclockwise, as viewed in Figure 4, the abutments 55 swing toward the flywheel hub 39 and the rear walls 56 swing away from the hub. In response to reverse rocking of the elements the abutments 55 swing away from the flywheel hub and the rear walls 56 swing toward the hub. The hammer-shaped elements 19 are separated by four wedge shaped sealing members 61. These members extend horizontally and are formed integrally with the outer marginal portion of the body 40 of the flywheel. They extend across the annular space between said outer marginal portion of the flywheel body and the outer marginal portion of the inner end wall 20 of the hollow supporting structure 12 and are adapted to rotate with the flywheel. The ends of the members 61 that are adjacent the inner end wall 20 fit slidably against the outer surface of said end wall. The central walls 54 and the abutments 55 of the elements serve as closures for the outer portions of the combustion chambers 29 and the members 61 assist in closing or sealing the chambers. Said members 61 are provided with concave rear surfaces 62, concave front surfaces 63 and concave inner surfaces 64. The rear surfaces 62 are curved conformably to the convex front surfaces of the abutments 55 and are in sliding contact with the last mentioned surfaces. Sealing strips 65 are located in grooves 66 in the rear surfaces 62 of the sealing members 61 and serve to seal the spaces between the abutments 55 of the hammer-shaped elements 19 and said rear surfaces 62. These sealing strips are co-extensive with the sealing members 61 and are urged outwards into contact with the front surfaces of the abutments 55 by way of leaf springs (not shown). The rear surfaces of the sealing members 61 are concave and conform in curvature to, and engage slidably, the convex rear walls 56 of the hammer-shaped elements 19. When the elements oscillate or rock the outer surfaces of the walls 56 slide back and forth relatively to the rear surfaces 62. Sealing strips 67 are mounted in longitudinally extending grooves 68 in the front surfaces 63 of the members 61 and serve as sealing media between said surfaces 63 and the convex outer surfaces of the rear walls 56 of the elements. Leaf springs (not shown) in grooves 68 serve to urge the sealing strips 67 outwards into contact with the rear walls 56 of the elements. The inner surfaces 64 of the sealing members 61 are curved conformably to the outer walls 33 of the stationary heads 16 and 17 and are adapted slidably to engage such walls in connection with drive or rotation of the flywheel.

In addition to the parts heretofore mentioned the engine includes a fuel inlet port 69 and an arcuate exhaust port 70. The fuel inlet port 69 is in the form of a circular hole which is formed in the inner end wall 20 of the hollow supporting structure 12 and is disposed in front of the rear wall 35 of the head 17. It is connected to a source of gaseous fuel, such, for example, as a carburetor, by way of a tube 71 which traverses the chamber 25 in the supporting structure 12 and extends through the removable outer end wall 22 of said structure. The exhaust port 70 is formed in the inner end wall 20. It is positioned adjacent and extends around the front wall 34 of the head 17 and communicates with the exterior of the hollow supporting structure 12 by way of a continuous arcuate web which is formed integrally with the end wall 20, traverses the chamber 25, and extends through a slot in the outer end wall 22 of the structure 12.

As shown in Figure 4, the hammer-shaped elements 19 are provided with spark plugs 72. These plugs extend through the front ends of the central walls 54 of the elements and are located directly behind the abutments 55. They are of conventional design and include inner and outer electrodes which are spaced apart and arranged to form spark gaps in the combustion chambers 29. The inner electrodes are centrally positioned and have exposed outer ends which project outwardly of the front ends of the elements 19. The spark plugs are adapted to receive electric current as they pass the rear wall 35 of the upper stationary head 16 by way of a spring contact 73. The latter is carried by a block 74 of insulation which is mounted on, and projects inwardly from, the upper portion of the cylindrical side wall 21 of the hollow supporting structure 12. As the elements, in connection with operation of the engine, rotate past the contact 73 the latter comes into contact with the outer ends of the inner electrodes of the spark plugs 72 and this results in a spark taking place between the spark gaps at the inner ends of the plugs. Due to the location of the contact 73 each plug is fired as it passes the rear wall 35 of the upper head 16.

The rotor of the engine which is shown in the drawings is adapted to rotate in a counterclockwise direction as viewed in Figure 4. During one complete revolution of the rotor each hammer-shaped element 19 goes through successive fuel intake, compression, ignition, combustion, expansion, and exhaust phases. The phases through which each element 19 passes are as follows: The first phase is the fuel intake phase. The element begins this phase when it is positioned directly beneath the flywheel hub 39 (see lowermost element 19 in Figure 4). In this position the central portion of the central wall 54 of the element is in engagement with the outer wall 33 of the lower stationary head 17 and the inner end of the abutment 55 of the element is in engagement with the flywheel hub at a point directly in front of the base or inner portion of the rear wall 35 of the head 17. In this position of the element the combustion chamber 29 is of minimum size. As the rotor rotates counterclockwise the abutment 55 of the element passes the fuel inlet port 69 and establishes communication between such port and the combustion chamber. As the rotor continues to rotate the combustion chamber increases in size as the result of travel of the abutment 55 away from the rear wall 35 of the head 17. Due to the suction that is created in the combustion chamber gaseous fuel is drawn into the chamber via the inlet port 69. When the rotor reaches a position wherein the inner end of the inner wall 56 of the element passes out of contact with the outer wall 33 of the head 17 in connection with further counterclockwise movement of the rotor the element is caused to rock in a clockwise direction so that said inner end of the rear wall 56 rotates inwardly until it contacts the hub 39. During clockwise rocking or oscillation of the element the abutment 55 swings away from the hub 39 of the flywheel. The first 90° arc of rotation of the rotor constitutes the fuel inlet phase. During further counterclockwise movement of the rotor the element remains in a position wherein the inner end of the rear wall 56 is in contact with the flywheel hub and the abutment 55 is away from the hub until the inner end of the abutment passes the outer wall 33 of the upper stationary head 16. While the element is travelling to such point the combustion chamber is of maximum size and is charged with gaseous fuel. As soon as the inner end of the abutment 55 passes the outer wall 33 of the head 16 the element is caused by the cam means hereinafter described, to rock in a counterclockwise direction in such manner that during further counterclockwise rotation of the rotor the inner end of the abutment slides inwards on the rear wall 35 of the head 16 and the central wall 54 of the element slides around the front wall 34 of the head 16. During rocking of the element around the upper stationary head 16 the combustion chamber 29 is reduced in size, that is, as far as volume is concerned, with the result that the charge of gaseous fuel is placed under compression. This constitutes the second or compression phase. When the inner end of the abutment slides into contact with the flywheel hub 39 the outer end of the spark plug for the element comes into engagement with the contact 73 and this results in firing of the fuel charge in the combustion chamber. Firing of the fuel charge constitutes the ignition and combustion phases and results in a power stroke being imparted to the element and other parts of the rotor. When, in connection with the power stroke or expansion phase, the inner end of the rear wall 56 of the element passes the outer wall 33 of the head 16 the element is caused again to rotate in a clockwise direction so that said inner end of the rear wall rotates inwards making contact with the hub 39 and the abutment 55 swings outwards. When, in connection with further rotation of the rotor, the inner end of the rear wall 56 comes in contact with the flywheel hub the combustion chamber 29 is of maximum displacement or size and is in communication with the exhaust port 70. At this point the exhaust phase occurs. During further or continued counterclockwise rotation of the rotor the inner end of the rear wall 56 is in engagement with the flywheel hub until the inner end of the abutment passes the outer wall 33 of the head 17. At this point the aforementioned cam means operates to rock the element in a counterclockwise direction so as to cause the inner end of the abutment 55 to slide inwardly against the rear wall 35 of the lower head 17. During inward sliding movement of the inner end of the abutment on the rear wall 35 of the lower head 17 the combustion chamber 29 is reduced in size with the result that substantially all of the products of combustion are discharged through the exhaust port 70. Travel of the element past the exhaust port concludes the last phase of the element. When the inner end of the abutment 55 comes in contact with the flywheel hub at a point adjacent the base or inner end of the rear wall 35 of the head 17 the element is in readiness again to start the aforementioned phases.

The four hammer-shaped elements 19 each successively goes through the aforementioned phases during one complete revolution of the rotor. As heretofore pointed out, when the elements pass the fuel inlet port 69 the combustion chambers thereof, due to the fact that they progressively increase in size, draw charges of fuel into them. As the elements rock around the upper stationary head the charges are compressed due to diminution in size of the combustion chambers. As soon as the outer ends of the inner electrodes of the spark plugs come into engagement with the contacts 73 the charges are fired and power impulses or strokes are imparted to the rotor. As the elements travel toward the lower stationary head 17 and are rocked around the latter in rotative succession the combustion chambers are caused to decrease in size with the result that the products of combustion are discharged via the exhaust port 70. Because there are four hammer-shaped elements 19 there are four power impulses or strokes imparted to the rotor during travel of the rotor through a 360° arc.

To prevent gas leakage around the upper stationary head 16 the latter is provided with a sealing strip 75 and a pair of sealing strips 76. The sealing strip 75 is mounted in a longitudinally extending groove 77 in the outer wall 33 of the head 16. The groove is of T-shaped cross section, as shown in Figure 4, and coacts with flanges 78 at the end of the strip 75 to limit outward movement of the strip. A leaf spring (see Figure 1) in the groove 77 serves to urge the sealing strip 75 outwards. When the inner ends of the abutments 55 or the central walls 54 of the elements 19 come in contact with the outer wall 33 of the head 16 the sealing strip 75 prevents the escape of gas past said last mentioned wall. The sealing strips 76 are slidably mounted in grooves 79 in the front wall 34 of the head 16 and are adapted to engage the central walls 54 of the elements 19 as the elements rock around the head 16. The grooves 79 are of T-shaped cross section and coact with flanges 80 at the ends of the strips 76 to limit outward movement of the strips. Leaf springs (not shown) in the grooves 79 serve to urge the strips 76 outwards into sealing engagement with the inner surfaces of the center walls 54 of the elements during passage of said surfaces thereby. The outer wall 33 of the lower stationary head 17 is sealed against the passage of gas thereby by way of a longitudinally extending sealing strip 81. This strip is mounted in a groove in the outer wall of the head 17 and is similar in design and function to the sealing strip 75. The inner ends of the abutments 55 of the hammer-shaped elements are provided with sealing strips 82 and 83. The sealing strips 82 are slidably mounted in grooves in the end surfaces of the abutments and are adapted to engage the flywheel hub when the inner ends of the abutments are in contact with the hub. They are limited in any suitable manner so far as sliding movement thereof is concerned and are urged in the direction of the flywheel hub by way of leaf springs (not shown). The sealing strips 83 are angularly positioned with respect to the sealing strips 82 and are slidably mounted in angularly positioned grooves in the back or rear surfaces of the abutments 55. They have enlarged outer portions which are adapted to engage the outer walls 33 and the rear walls 35 of the heads 16 and 17 in connection with sliding of the inner ends of the abutments on said walls. As illustrated in Figure 4, the outer enlarged portions of the strips 83 are positioned behind the sealing strips 82 and have bevelled surfaces for sliding contact with the walls 33 and 35. The strips 83 extend completely across the abutments and are limited so far as sliding movement is concerned in any suitable manner. Leaf springs or other spring means (not shown) serve to urge the sealing strips 83 away from the abutments. The inner ends of the rear walls 56 of the elements 19 are provided with sealing strips 84. These are slidably mounted in grooves in the inner ends of the rear walls 56 and are adapted to engage the outer periphery of the hub 39 of the flywheel. Sliding movement of the strips 84 with respect to their grooves is limited in any suitable manner and leaf springs (not shown) are disposed in such grooves in order to urge the strips 84 into sealing contact with the flywheel hub.

Figure 2:
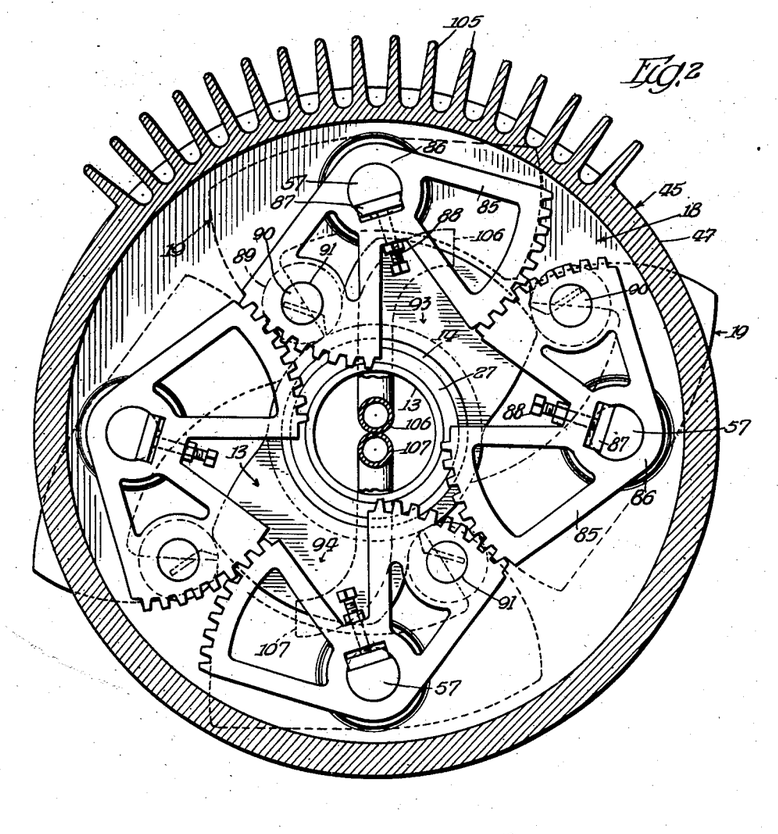
Figure 2 is a vertical transverse section taken on the line 2—2 of Figure 1 and showing in detail the construction and arrangement of the means whereby the oscillatory hammer-shaped elements are caused to rock or oscillate in synchronism.
Figure 3:
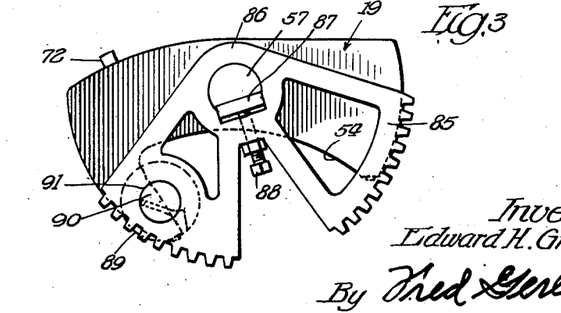
Figure 3 is an end view of one of the gear segments which constitute the means for effecting synchronous rocking or oscillation of the elements.

The hammer-shaped elements 19 are geared together so that they rock or oscillate in unison, that is, in a synchronous manner, by way of four gear segments 85. These segments are disposed in the chamber 52 within the shell 45 and have hubs 86 which fit around the outer ends of the shafts 57. Blocks 87 and set screws 88 are associated with the hubs 86 and serve fixedly or rigidly to secure the gear segments 85 to the shafts 57. The gear segments mesh with one another, as shown in Figure 2. Due to the meshing relationship of the gear segments when two diametrically opposite elements 19 are caused to rock clockwise the other two elements are caused to rock counterclockwise. In other words when two diametrically opposite elements are caused, as hereinafter described, to rock in a clockwise direction the other elements are caused to rock counterclockwise and when such two diametrically opposite elements are caused to rock reversely, that is in a counterclockwise direction the other elements are caused to rotate in a clockwise direction.

The cam means for oscillating or rocking the hammer-shaped elements 19 during drive or rotation of the rotor includes the cam 15 on the cam holder 14. It also includes or comprises four rollers 89 which are associated with, and carried by, the gear segments 85, respectively. The rollers are aligned with, and are adapted to travel around, the edges of the cam 15 and are rotatably mounted on stub axles 90 which fit within holes 91 in the leading portions of the gear segments 85. The cam 15, as best shown in Figures 8 to 11, inclusive, consists of a cylindrical hub 92 around the outer end of the cam holder 14 and in addition a pair of radially extending diametrically opposite protuberances 93 and 94. The protuberance 93 projects upwards and is disposed approximately 30° from the vertical in a clockwise position as viewed in Figures 8 to 11, inclusive. The protuberance 94 projects downwards and is positioned approximately 30° from the vertical in a counterclockwise direction, as viewed in said figures. The hub 92 of the cam 15 embodies between the two protuberances diametrically opposite concentric arcuate edges 95 and 96. The protuberance 93 has a convex leading edge 97, a convex circumferential edge 98 and a convex trailing edge 99. The leading edge 97 extends substantially radially and joins one end of the edge 95 of the cam hub. The circumferential edge 98 of the protuberance 93 is concentric with respect to the cam hub 92. The trailing edge 99 is substantially parallel to the leading edge 97 and extends between, and joins, the trailing end of the circumferential edge 98 and one end of the hub edge 97. The protuberance 94 is positioned diametrically opposite the protuberance 93 and has a convex leading edge 100, a convex circumferential edge 101 and a convex trailing edge 102. These last mentioned edges are the same in shape and length as the edges 97, 98 and 99 of the protuberance 93, respectively. The edge 100 is longitudinally aligned with the trailing edge 99 of the protuberance 93 and joins the arcuate edge 96 of the cam hub. The convex circumferential edge 101 of the protuberance 94 is concentrically arranged with respect to the hub 92 and the trailing edge 102 is longitudinally aligned with the leading edge 97 of the protuberance 93 and joins and extends between the trailing end of the circumferential edge 101 and one end of the arcuate edge 95 of the hub 92. The protuberance 93 controls rocking of the elements with respect to the upper stationary head 16 and the protuberance 94 of the cam controls rocking of the elements relatively to the lower stationary head 17.

During one complete revolution of the rotor each hammer-shaped element is controlled in the following manner by the roller 89 which is associated with its gear segment 85. When the element is at the initial part of its fuel intake phase the inner end of the abutment 55 is in contact with the flywheel hub 39 at a point adjacent the base or inner end of the rear wall 35 of the lower head 17, the central wall 54 of the element is in engagement with the outer wall 33 of the head 17 and the roller is at the junction of the edges 95 and 102 of the cam. During initial rotation of the rotor the roller travels along the edge 95 and maintains the element in a position wherein the inner end of the abutment 55 is in contacting relation with the flywheel hub and the rear wall 56 of the element is away from the hub of the flywheel. As the roller rides along the edge 97 it operates to swing the element in a clockwise direction as viewed in Figures 2 and 4 and causes the abutment 55 to swing away from the flywheel hub and the inner end of the rear wall 56 of the element to swing into engagement with the hub of the flywheel. After rolling over the edge 97 of the cam protuberance 93 the roller rolls onto and traverses the circumferential edge 98 of said protuberance. During travel of the roller over the edge 98 the element is maintained in a position wherein the abutment 55 thereof is positioned a maximum distance away from the flywheel hub and the inner end of the wall 56 is in contact with said hub. After traversing or rolling over the edge 98 the roller rolls onto and traverses the trailing edge 99 of the protuberance 93 (see Figures 8, 9 and 10). As the roller rolls over such edge the element is caused to swing or rock in a counterclockwise direction in order to complete the compression phase. As the roller 89 rolls toward the inner end of the edge 99 the inner end of the abutment 55 is caused to slide inwards on the rear wall 35 of the head 16 and the central wall 54 is caused slidably to engage the front walls of said head 16. When the roller reaches the junction of the edges 99 and 96 the inner end of the abutment 55 is in engagement with the flywheel hub at a point at the base or inner end of the rear wall 35 of the head 16 and the central portion of the central wall 54 is in engagement with the outer wall 33 of said head 16. At this point the element goes through its ignition and combustion phases. During further rotation of the rotor the roller 89 travels along the concentric arcuate edge 96 of the cam hub and causes the element to maintain its position wherein the inner end of the abutment 55 is in contact with the flywheel hub and the rear wall 56 is disposed a maximum distance from the flywheel hub. As soon as the roller reaches the junction of the edges 96 and 100 the element ends its expansion phase. During further rotation of the rotor the roller is caused to roll along the edge 100 and this causes the element to swing in a clockwise direction. During such swinging the abutment 55 moves away from the flywheel hub and the rear wall 56 moves into contact or engagement with the adjacent portion of the hub of the flywheel. After traversing the edge 100 of the cam protuberance 94 the roller rolls along the circumferential edge 101. The roller rolls along this edge until the inner end of the abutment 55 comes into contact with the outer portion of the rear wall 35 of the lower stationary head 17. As soon as the element reaches this point the roller travels inwards along the trailing edge 102 of the protuberance 94 and causes the element to swing in a counterclockwise direction. During such swinging the inner end of the abutment traverses the rear wall 35 of the head 17 and the central wall 54 slides around the front wall 34 of said head 17. During rocking of the element around the head 17, due to travel of the roller along the edge 102, the combustion chamber for the element is reduced in size with the result that the products of combustion are extruded or discharged through the exhaust port 70, as hereinbefore described.

The rollers 89 are so arranged that when two are travelling on the edges 95 and 96 the other two are travelling on the edges 98 and 101. Likewise when the two rollers reach and travel on the edges 97 and 100 the other two reach and travel on the edges 99 and 102. During travel of two of the rollers on the edges 95 and 96 and travel of the other two rollers on the edges 98 and 101 the elements are stationary. When the two rollers reach and travel on the edges 97 and 100 their elements are caused to swing clockwise into a position for receiving the heads 16 and 17 and when the other two rollers reach and travel on the edges 99 and 102 their elements are caused to swing counterclockwise so as to bring the abutments thereof into contact with the flywheel hub and their rear walls away from the hub. Due to the arrangement of the cam means comprising the cam 15 and the rollers 89 the elements are caused successively to rock around the two stationary heads in order to vary the size of the combustion chambers for purposes heretofore mentioned. The gear segments 85 cause the elements 19 to rock in synchronism, that is, in a symmetrical or balanced pattern.

The oscillatory hammer-shaped elements 19 are provided with outwardly projecting longitudinally extending laterally spaced fins 103 for heat dissipating purposes. These fins are formed integrally with the central walls 54 and effectively air-cool the elements. The sealing members 61 between the elements have outwardly projecting integral circumferentially extending fins 104 for heat transfer purposes. The rotor is additionally cooled by way of a plurality of radially extending outwardly projecting fins 105 on the exterior of the shell 45.

The interiors of the heads 16 and 17, the chamber 25 in the hollow supporting structure 12, the interior of the tubular shaft 13 and the chamber 52 in the shell 45 are filled with oil. The oil in the shell serves to lubricate the bearing 41, the thrust bearing 53, the bearings 58 and the rollers 89 and is cooled due to the heat transfer action of the fins 105 on the shell. In order to cause the oil to circulate from the chamber 52 through the interiors of the heads 16 and 17 and thence back to said chamber 52 two tubes 106 and 107 are provided. The central portion of the tube 106 extends through the supporting shaft 13. One end of the tube extends upwards through the chamber 25 in the hollow supporting structure 12 and thence into the interior of the upper stationary head 16. The other end of the tube 106 extends upwards into the chamber 52 in the shell 45 and has its extremity open and extending in a clockwise position as viewed in Figure 4. During counterclockwise rotation of the rotor the oil in the chamber 52 is caused to swirl or rotate bodily and a portion is scooped up by the open extremity of said other end of the tube 106. The oil which enters said extremity flows through the tube 106 into the interior of the head 16 and then returns to the chamber 52 via the chamber 25 in the hollow supporting structure and the interior of the tubular supporting shaft 13. The constant circulation of oil through the head 16 in connection with operation of the engine results in effective cooling of the head. The tube 107 is disposed beneath the tube 106 and is arranged so that the central portion thereof extends through the shaft 13. One end of the tube 107 extends downwards in the chamber 25 and thence into the interior of the lower stationary head 17. The other end of the tube 107 extends downwards in the chamber 52 in the shell 45 and has its extremity open and extending in a clockwise direction, as viewed in Figure 2. When the engine is in operation and the rotor is caused to rotate in a counterclockwise manner as viewed in Figure 4, a portion of the oil in the shell is scooped into the tube 107 and flows through the tube into the interior of the head 17. After flowing through the interior of said head the oil returns to the chamber 52 via the chamber 25 in the hollow supporting structure 12 and the interior of the shaft 13. The two tubes 106 and 107 constitute simple means for circulating a cooling fluid such as oil through the heads 16 and 17. As the oil which is discharged into the interiors of the two heads 16 and 17 flows through the chamber 25 and the hollow supporting structure 12 in connection with return thereof to the chamber 52 cooling of the hollow supporting structure 12 is effected. The side wall 47 of the shell 45 is provided with holes 108 therein in order to permit the chamber 52 to be filled with oil and also to permit oil to be drained from the chamber. These holes 108 are closed by means of screw type plugs 109.

The herein described engine consists of a minimum number of operating parts and hence may be manufactured at a low and reasonable cost. It eliminates or dispenses with the use of a crank shaft and intake and exhaust valves and is characterized by the fact that it is extremely efficient in operation and develops a comparatively large amount of horsepower in comparison to its size and weight. The engine is further characterized by the fact that it has exceptionally high mechanical efficiency and low oil consumption as well as compactness and durability. Due to the arrangement of the parts the engine may be readily dismantled in connection with repair or inspection thereof.

The invention is not to be understood as restricted to the details set forth since these may be modified within the scope of the appended claims without departing from the spirit and scope of the invention.

This application is a continuation in part of an application for United States Letters Patent filed by me on February 6, 1939, Serial No. 254,955, now abandoned.

Having thus described my invention what I claim as new and desire to secure by Letters Patent is:

1. An internal combustion engine comprising a central member, a pair of heads at opposite sides of the member, a flywheel at one side of the heads adapted to rotate in one direction relatively to the central member and heads, a plurality of centrally pivoted hammer-shaped elements carried by the flywheel in an annular series around said central member and heads and having inwardly extending abutments at their leading ends and also combustion chambers between them and said central member and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fluid into the combustion chambers as the elements rotate past and beyond one of the heads, and means for exhausting the said chambers as elements rotate toward one of the heads.

2. An internal combustion engine comprising a central member, a pair of stationary heads at opposite sides of the member, a flywheel at one side of the heads adapted to rotate in one direction, a plurality of rigid centrally pivoted hammer-shaped elements carried by the flywheel in an annular series around the central member and heads and having inwardly extending abutments at their leading ends and also combustion chambers between them and said central member and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, consisting of a stationary cam and cam engaging rollers associated with the elements respectively, means for introducing fluid into the combustion chambers as the elements rotate past and beyond one of the heads, and means for exhausting the said chambers as the elements rotate toward said one head.

3. An internal combustion engine comprising a central member, a pair of stationary heads at opposite sides of the member, a flywheel at one side of the heads adapted to rotate in one direction, an annular series of rock shafts having certain of the ends thereof disposed around and outwards of the central member and the heads and their other ends extending through and journalled in the flywheel, hammer-shaped elements corresponding in number to the rock shafts and having the central portions thereof fixed to said certain ends of the rock shafts and having inwardly extending abutments at their leading ends and also combustion chambers between them and said central member and heads, gears fixed to said other ends of the rock shafts and meshing with one another so as to cause the shafts and elements to rock in synchronism, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fuel into the combustion chambers as the elements rotate past and beyond one of the heads, means for firing the fuel in the chambers as the elements rotate past the other head, and means for exhausting the products of combustion from said chambers as the elements rotate toward said one head.

4. An internal combustion engine comprising a central member, a pair of stationary heads at opposite sides of the member, a flywheel at one side of the heads adapted to rotate in one direction, an annular series of rock shafts having certain of the ends thereof disposed around and outwards of the central member and the heads and their other ends extending through and journalled in the flywheel, rigid hammer-shaped elements corresponding in number to the rock shafts and having the central portions thereof fixed to said certain ends of the rock shafts and having inwardly extending abutments at their leading ends and also combustion chambers between them and said central member and heads, gears fixed to said other ends of the rock shafts and meshing with one another so as to cause the shafts and elements to rock in synchronism, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, consisting of a stationary cam adjacent the gears and cam engaging rollers on the gears, means for introducing fuel into the combustion chambers as the elements rotate past and beyond one of the heads, means for firing the fuel in the chambers as the elements rotate past the other head, and means for exhausting the products of combustion from said chambers as the elements rotate toward said one head.

5. An internal combustion engine comprising a supporting structure with an end wall, a flywheel in spaced and parallel relation with the end wall and adapted to rotate in one direction, a cylindrical member between the central portions of the end wall and flywheel, a pair of heads disposed in the space between the end wall and flywheel and fixed to said end wall so that they are disposed at opposite sides of the cylindrical member, a plurality of centrally pivoted hammer-shaped elements carried by the flywheel in an annular series around said cylindrical member and the heads and having inwardly extending abutments at their leading ends and also combustion chambers between them and said cylindrical member and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means including an inlet port in said end wall of the supporting structure for introducing fluid into the combustion chambers as the elements rotate past and beyond one of the heads, and means including an exhaust port in said end wall for exhausting the chambers as the elements rotate toward said one head.

6. An internal combustion engine comprising a supporting structure with a flat end wall and a shaft projecting perpendicularly from the central portion of said end wall, a flywheel adapted to rotate in one direction and having a hub mounted rotatively on the shaft and a body in rigid relation with the hub and in spaced and parallel relation with said end wall, a pair of heads disposed in the space between the end wall of the supporting structure and the body of the flywheel and connected to said end wall so that they are disposed at opposite sides of, and in contacting relation with, the flywheel hub, a plurality of centrally pivoted hammer-shaped elements carried by the body of the flywheel in an annular series around the flywheel hub and the heads and having inwardly extending abutments at their leading ends and also combustion chambers between them and said flywheel hub and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fuel into the combustion chambers as the elements rotate past and beyond one of the heads, means for firing the fuel in the chambers as the elements rotate past the other head, and means for exhausting the products of combustion from said chambers as the elements rotate toward said one head.

7. An internal combustion engine comprising a supporting structure with a flat end wall and a shaft projecting perpendicularly from the central portion of said end wall, a flywheel adapted to rotate in one direction and having a hub mounted rotatively on the shaft and a body in rigid relation with the hub and in spaced and parallel relation with said end wall, a pair of heads disposed in the space between the end wall of the supporting structure and the body of the flywheel and connected to said end wall so that they are disposed at opposite sides of, and in contacting relation with, the flywheel hub, a plurality of centrally pivoted hammer-shaped elements carried by the body of the flywheel in an annular series around the flywheel hub and the heads and having inwardly extending abutments at their leading ends and also combustion chambers between them and said flywheel hub and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means including an inlet port in the end wall of the supporting structure for introducing fuel into the combustion chambers as the elements rotate past and beyond one of the heads, means for firing the fuel in such chambers as the elements rotate past the other head, and means including an exhaust port in said end wall for exhausting the products of combustion from the chambers as the elements rotate toward said one head.

8. An internal combustion engine comprising a central member, a pair of stationary heads at opposite sides of the member, a flywheel at one side of the heads adapted to rotate in one direction, a plurality of centrally pivoted hammer-shaped elements carried by the flywheel in an annular series around the central member and the heads, and having inwardly extending abutments at their leading ends and also combustion chambers between them and said central member and heads, spark plugs carried by the elements directly behind the abutments, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fuel into the combustion chambers as the elements rotate past and beyond one of the heads, means for supplying the spark plugs with current as the elements rotate past the other head, and means for exhausting the products of combustion from said combustion chambers as the elements rotated toward said one head.

9. An internal combustion engine comprising a stationary supporting structure having a substantially flat end wall, a flywheel in spaced and parallel relation with said end wall, a substantially cylindrical member between the central portion of the end wall and flywheel, a pair of stationary heads disposed in the space between the end wall and flywheel and positioned at opposite sides of the cylindrical element, a plurality of centrally pivoted hammer-shaped elements carried by the flywheel in an annular series around the cylindrical member and heads and having inwardly extending abutments at their leading ends and also combustion chambers between them and said cylindrical member and heads, spark plugs mounted in the elements directly behind the abutments, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means including an inlet port in the end wall of the supporting structure for introducing fuel into the combustion chambers as the elements rotate past and beyond one of the heads, means carried by said supporting structure for supplying current to the spark plugs as the elements rotate past the other head, and means including an exhaust port in said end wall for exhausting the products of combustion from the chambers as the elements rotate toward said one head.

10. An internal combustion engine comprising a supporting structure with an end wall, a rotary flywheel in spaced and parallel relation with said end wall and adapted to rotate in one direction, a substantially cylindrical member between the central portions of the end wall and flywheel, a pair of stationary heads in the space between the end wall and flywheel, disposed at opposite sides of said cylindrical member and having convex front walls and convex rear walls, a plurality of centrally pivoted hammer-shaped elements carried by the flywheel in an annular series in said space and around the cylindrical member and heads and having concave central walls and inwardly extending abutments at the leading ends of the central walls and also having combustion chambers between them and said cylindrical member and heads, means for causing the elements during rotation or travel thereof between the heads to rock in such direction as to swing the abutments outwards for head accommodating purposes and also causing the elements during rotation past the heads to rock in the opposite direction in such manner that the inner ends of the abutments slide inwards against the rear walls of the heads and the central walls slide against the front walls of said heads and the size of the combustion chambers is thus decreased, means for introducing fluid into the combustion chambers as the elements rotate past and beyond one of the heads, and means for exhausting said chambers as the elements rotate toward said one head.

11. An internal combustion engine comprising a supporting structure with an end wall, a rotary flywheel in spaced and parallel relation with said end wall and adapted to rotate in one direction, a substantially cylindrical member between the central portions of the end wall and flywheel, a pair of stationary heads in the space between said end wall and flywheel disposed at opposite sides of said cylindrical member and having convex front walls and more sharply convex rear walls, a plurality of centrally pivoted hammer-shaped elements carried by the flywheel in an annular series in said space and around the cylindrical member and heads and having concave central walls, inwardly extending abutments at the leading ends of the central walls and with convex front surfaces and rearwardly curved outwardly extending rear walls at the trailing ends of the central walls, and also having combustion chambers between them and said cylindrical member and heads, sealing members between the elements carried by the flywheel and having concave rear faces in sliding engagement with the front convex faces of the abutments and concave front faces in sliding engagement with the rear walls of the elements, means for causing the elements during rotation or travel thereof between the heads to rock in such direction as to swing the abutments outwards for head accommodating purposes and also causing the elements during rotation past the heads to rock in the opposite direction in such manner that the inner ends of the abutments slide inwards against the rear walls of the heads and the central walls slide against the front walls of said heads and the size of the combustion chambers is thus decreased, means for introducing fluid into the combustion chambers as the elements rotate past and beyond one of the heads, and means for exhausting said chambers as the elements rotate toward said one head.

12. An internal combustion engine comprising a supporting structure with an end wall, a rotary flywheel in spaced and parallel relation with said end wall and adapted to rotate in one direction, a cup-shaped lubricant carrying shell positioned at the outer side of the flywheel and connected to said flywheel so as to rotate therewith, a substantially cylindrical member between the central portions of the end wall and flywheel, a pair of stationary heads disposed in the space between the end wall and flywheel and located at opposite sides of said cylindrical member, a plurality of centrally pivoted hammer-shaped elements carried by the flywheel in an annular series around the cylindrical member and heads and having inwardly extending abutments at their leading ends and also combustion chambers between them and said cylindrical member and heads, cam means in the shell for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fluid into the combustion chambers as the elements rotate past and beyond one of the heads, and means for exhausting said chambers as the elements rotate toward said one head.

13. An internal combustion engine comprising a supporting structure with an end wall, a rotary flywheel in spaced and parallel relation with said end wall and adapted to rotate in one direction, a cup-shaped lubricant carrying shell positioned at the outer side of the flywheel and connected to said flywheel so as to rotate therewith, a substantially cylindrical member between the central portions of the end wall and flywheel, a pair of stationary heads disposed in the space between the end wall and flywheel and located at opposite sides of said cylindrical member, a plurality of centrally pivoted hammer-shaped elements carried by the flywheel in an annular series around the cylindrical member and heads and having inwardly extending abutments at their leading ends and also combustion chambers between them and said cylindrical member and heads, meshing gears associated with the elements respectively and disposed in the shell for causing the elements to rock or pivot in synchronism, cam means also in said shell for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fuel into the combustion chambers as the elements rotate past and beyond one of the heads, means for firing the fuel in the chambers as the elements rotate past the other head, and means for exhausting the products of combustion from said chambers as the elements rotate toward said one head.

14. An internal combustion engine comprising a stationary supporting structure having a flat end wall and in addition a shaft extending perpendicularly to said end wall and having one end thereof secured to the central portion of said end wall, a flywheel in spaced and parallel relation with said end wall, mounted on the central portion of the shaft and adapted to rotate in one direction, a pair of stationary heads disposed in the space between the end wall and flywheel and positioned at opposite sides of the shaft, a plurality of centrally pivoted hammer-shaped elements carried by the flywheel in an annular series in said space and around the shaft and heads and having inwardly extending abutments at their leading ends and also combustion chambers inwardly thereof, means including a cam fixedly connected to the other end of the shaft for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fluid into the combustion chambers as the elements rotate past and beyond one of the heads, and means for exhausting said chambers as the elements rotate toward said one head.

15. An internal combustion engine comprising a supporting structure wtih an end wall, a rotary flywheel disposed in spaced and parallel relation with said end wall and adapted to rotate in one direction, a cup-shaped liquid filled shell located at the outer side of the flywheel and connected to the flywheel so as to rotate therewith, a substantially cylindrical member between the central portions of the end wall and flywheel, a pair of stationary hollow heads disposed in the space between the end wall and flywheel and positioned at opposite sides of the cylindrical member, a plurality of centrally pivoted hammer-shaped elements carried by the flywheel in an annular series in said space and around the cylindrical member and heads and having inwardly extending abutments at their leading ends and also combustion chambers between them and said cylindrical member and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fluid into the combustion chambers as the elements rotate past and beyond one of the heads, means for exhausting said chambers as the elements rotate toward said one head, and means for circulating the liquid in the shell into the hollow heads and back again in order to cool the heads.

16. An internal combustion engine comprising a hollow supporting structure with an end wall, a tubular shaft extending perpendicularly to the end wall and having one end thereof extending through the central portion of the end wall and communicating with the interior of the structure, a rotary flywheel in spaced and parallel relation with said end wall, mounted on the central portion of the shaft and adapted to rotate in one direction, a cup-shaped shell located on the outer side of the flywheel and having the side wall thereof connected to the marginal portion of the flywheel so that it rotates with the flywheel, a pair of hollow heads in the space between the end wall and flywheel disposed at opposite sides of the shaft and having the interiors thereof in communication with the interior of the supporting structure, a plurality of centrally pivoted hammer-shaped elements carried by the flywheel in an annular series in said space around the shaft and heads and having inwardly extending abutments at their leading ends and also combustion chambers between them and said shaft and heads, means for causing the elements during rotation or travel thereof between the heads to rock in such direction as to swing the abutments outwards for head accommodating purposes and also causing the elements during rotation past the heads to rock in the opposite direction around said heads in order to decrease the size of the combustion chambers, means for introducing fuel into the combustion chambers as the elements rotate past and beyond one of the heads, means for firing the fuel in the chambers as the elements rotate past the other head, means for exhausting the products of combustion from said chambers as the elements rotate toward said one head, said heads supporting structure, tubular shaft and shell being adapted to hold a body of liquid, and means in the form of tubes extending from the interior of the shell through the shaft and thence through the supporting structure and into the heads for causing the liquid to circulate from the shell into the heads and thence back to the shell via the supporting structure and shaft.

EDWARD H. GREEN.